Figure 1:
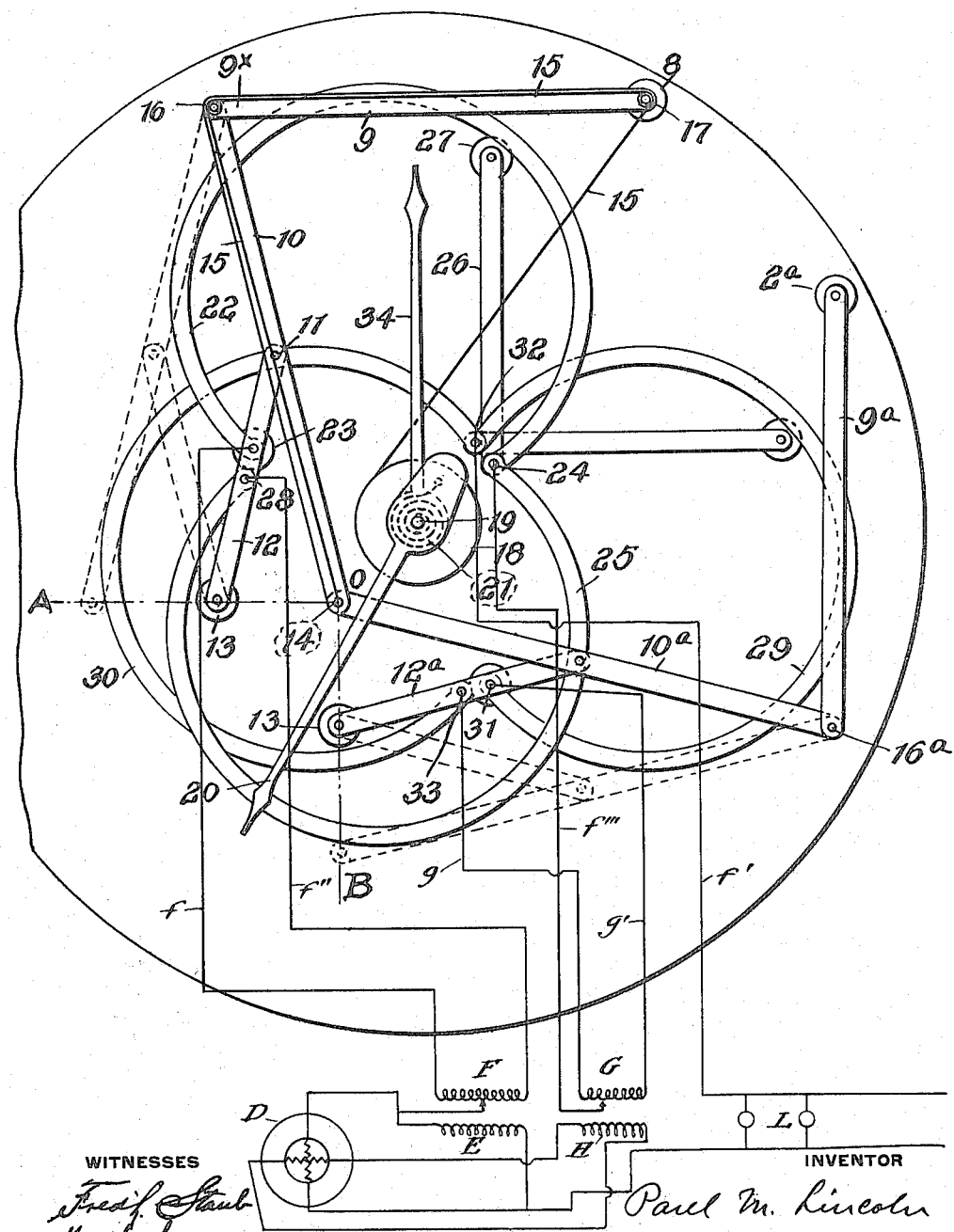

P. M. LINCOLN.
VOLT AMPERE METER.
APPLICATION FILED JUNE 19, 1914.

1,161,395.

Patented Nov. 23, 1915.
3 SHEETS—SHEET 1.

WITNESSES

INVENTOR
Paul M. Lincoln

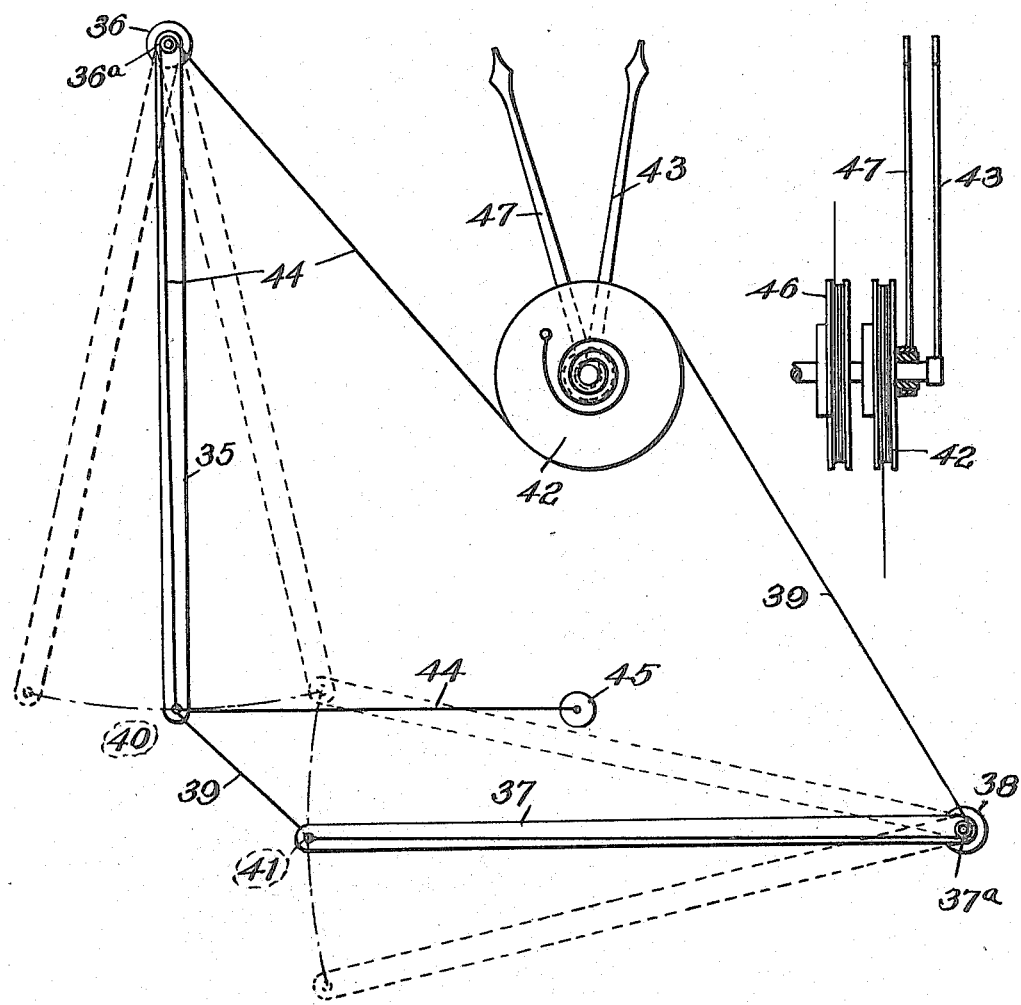

P. M. LINCOLN.
VOLT AMPERE METER.
APPLICATION FILED JUNE 19, 1914.
1,161,395.
Patented Nov. 23, 1915.
3 SHEETS—SHEET 3.
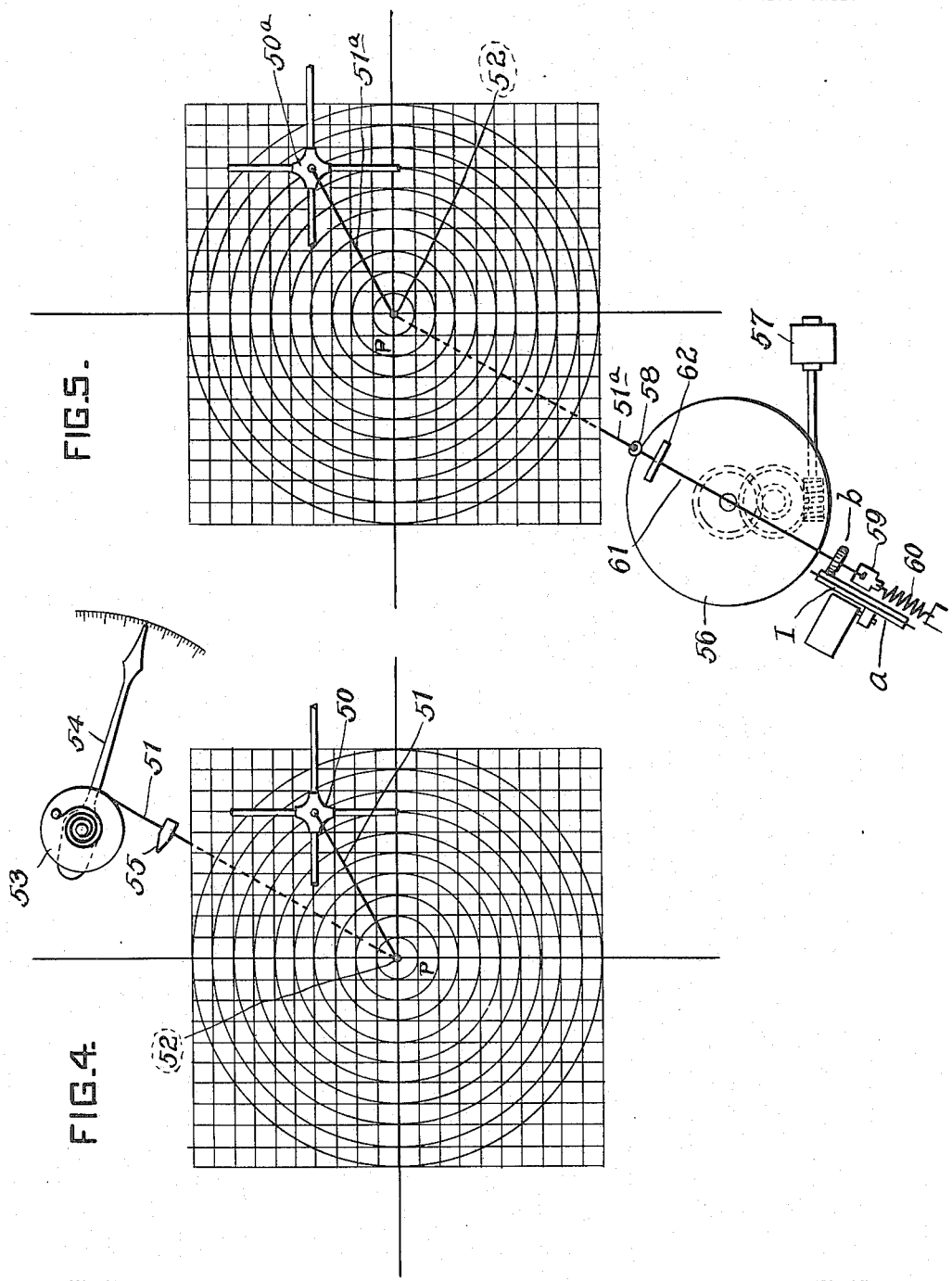

UNITED STATES PATENT OFFICE.

PAUL M. LINCOLN, OF PITTSBURGH, PENNSYLVANIA.

VOLT-AMPERE METER.

1,161,395.	Specification of Letters Patent.	Patented Nov. 23, 1915.

Application filed June 19, 1914. Serial No. 846,096.

*To all whom it may concern:*

Be it known that I, PAUL M. LINCOLN, a citizen of the United States, residing at Pittsburgh, in the State of Pennsylvania, have invented a certain new and useful Volt-Ampere Meter, of which the following is a specification.

My invention relates to electric measuring instruments generally and more particularly to volt-ampere meters showing maximum demand.

Its primary objects are to increase the accuracy and sensitiveness of such instruments, to compensate for changes of extraneous conditions as changes of atmospheric temperature, and to generally improve the construction and operation of such instruments.

I have shown examples of apparatus embodying my invention in the accompanying drawing, in which—

Figure 1 is a diagrammatic plan of the essential working parts of the instrument, omitting the instrument frame, casing and dial, for clearness; together with a diagram of electric connections. Figs. 2 and 3, show respectively in plan and side elevation, the working parts of a modified volt-ampere meter; Figs. 4 and 5 are plan diagrams illustrating still other embodiments of certain features of the invention.

In my application No. 839,051, I have explained in part the principles of an ammeter in which I employ a pair of elements whose changes of relative position due to differential change of temperature actuates an indicator, and my present application embodies in a general way the same principle except that wattmeter movements are used instead of ammeter movements. For example, in Fig. 1, I mount on a fixed pivot 8 a link 9 whose free end 9$^x$ is pivoted to another link 10, which in turn is pivoted by pin 11 to link 12, fixedly pivoted at 13. The lower end of the link 10 is provided with a small hole 14, up through which there is passed a cord 15, which passes around a very small pulley 16 on the left end of link 9 and a small pulley 17 on the fixed end of link 9, and thence passes around the grooved periphery of a pulley 18 which is mounted on a fixed stud 19 and carries a dial pointer 20. I also provide a spiral spring 21 attached respectively to the pointer 20 and to stud 19, tending to return the pointer to its zero position after deflection, and to take up all back lash. This mechanism constitutes the moving parts of a thermal wattmeter.

In addition to the links just described, I provide an entirely similar set of links 9$^a$, 10$^a$ and 12$^a$, arranged as shown, so that the left hand end of the link 10$^a$, at zero load lies directly under the hole (14) in the end of the link 10; and to this is attached the end of the cord 15 which operates the pointer 20, as above described. As the link 10 swings from its full line position to its dotted line position shown, the lower end will swing to the left in practically a straight line from the point O to the point A, while the upper end will have a very slight travel which is practically vertical. It is a desirable feature of my instrument that the movement of point O is virtually a straight line motion. Evidently the said motion of the link 10 will draw the cord 15 proportionally, and turn the pointer 20 proportionally to this line movement.

Similarly the second set of links 9$^a$, 10$^a$, have the effect of forcing the left end of the link 10$^a$ to move in a substantially vertical line from O to B as shown in dotted lines; and as it has the cord 15 attached to it, the resulting extension of this cord will be proportional to this movement, and will tend to so move the pointer 20. The directions OA and OB are at right angles to each other.

For actuating the links, I provide a bent tube 22 fixedly pivoted to a point 23 on the frame, and at its other end 24 I pivot it to another like tube 25, and to a swinging link 26 fixedly pivoted at 27. The other end of the tube 25 is pivoted, at the point 28, to the straight link 12. These tubes may be made of any desired construction, preferably hollow and filled with a highly expansible liquid, and provided with any desired means for differentially heating them by electric currents, (as indicated in my Patent No. 1,156,412 granted Oct. 12, 1915, on application filed Nov. 5, 1913, or otherwise). For example, supposing the use of a two phase generator D in circuit with the load L., I may provide two transformers taking off currents proportional to voltage and amperage. The coil E, being a shunt coil, forms the primary of a transformer of which the secondary is F, and excites current therein, which by the leads $f$, $f''$ traverses the bent tubes 22 and 25 in series. The coil F is also in series with the main line, and it will be seen that thereby a current proportional to amperage will also traverse the members 22 and 25 by the leads $f$, $f''$ and $f'''$. On the other phase of the generator I provide a shunt coil H forming the primary of a transformer whose secondary is G, connected by the leads $g$, $g'$ to carry the induced currents through the curved bars 29 and 30 in series, and by the same leads and lead $f'$, I carry current also in parallel through these two bars. In this way each pair of expansible bars has its members heated differentially so as to measure the algebraic sum of the currents proportional to voltage and the currents proportional to amperage. The means of doing this is not part of the present invention; it is sufficient that tubes 22 and 25 are so heated as to cause a movement of the end 28 of tube 25 proportional to the watts of the current to be measured. Manifestly the movement of point 28 will move the straight link 12 and therefore the link 10 and draw the cord 15 as before described, thereby moving the pointer 20 in proportion to the wattage of the current, as for example, described in my said Patent No. 1,156,412. Similarly, the pair of expansion tubes 29 and 30, the first fixedly pivoted at 31 and attached to the second at 32 and the latter to the bar $12^a$ at 33, will move the left hand end of the link $10^a$ in a vertical direction, and as before described, draw out the cord 15 and tend to move the pointer 20 in proportion to the wattless component of the current, on account of the action of these tubes.

The volt-amperes are indicated by the combined effects of the extension of the cord 15 due to relative expansions of tubes 22 and 25, and that due to the relative expansions of the tubes 29 and 30. That is, the angular movement of the pointer shaft 19 will be proportional to the distance between the free ends of the actuating links 10 and $10^a$, to which the cord is attached. It will therefore indicate the volt-amperes.

The use of the particular kind of wattmeter shown, and the particular kind of wattless component meter shown, are incidental, and not essential to my invention. Any combination of instruments that indicate the watts and the wattless component will suffice, my invention residing more in the principle of so combining them as to obtain a certain resultant. Preferably I also provide on the instrument another pointer 34, designed, as is usual in such instruments, to be pushed forward by the indicating pointer 20 but not withdrawn thereby on the reverse movement. This pointer 34 will therefore indicate the maximum demand since the meter was last set. Any convenient means for resetting this pointer may be employed, as indicated in my previous application No. 839,051, of May 16, 1914.

I have shown a simplified modification of the instrument in Fig. 2, which though not so accurate is much cheaper. The two arms 35 and 37 are fixedly pivoted respectively at 36 and 38; and, as before, the arm 35 will be actuated by a wattmeter movement, and the arm 37 by a wattless component meter movement, just as in Fig. 1. The average position of these two arms is at right angles to each other, and the movements respectively nearly horizontal and vertical. The fine cord 39 is attached to the arm 35 at the point 40 and thence passes through a hole 41 in the free end of arm 37, thence around small pulley $37^a$ and to the pulley 42 carrying a pointer 43, similar to the before described mechanism. The motion of the pointer 43 is dependent on the distance apart of the points 40 and 41, and indicates the volt-amperes of the circuit to be measured.

Again I may use another thin cord 44 attached to a fixed point 45 on the frame of the instrument case, from which it passes through a hole at the point 40 in the arm 35, thence around small pulley $36^a$, and to a second pulley 46, actuating a pointer 47, which will therefore register the watts of the circuit to be measured. The same scale may thus be used for indicating both watts and volt-amperes and of course also this form of the instrument may have a maximum demand indicator as before. Also it may of course indicate the wattless component by use of another cord and pointer moved by arm 37 alone.

In Figs. 4 and 5, I have shown still another method of obtaining a linear value proportional to volt-amperes.

In my Patent No. 1,156,413, granted Oct. 12, 1915, on application filed November 29th, 1913, I have shown a volt-ampere meter having a scale which consists of a plane surface on which the indication is made by the point of intersection of two movable rods actuated by electric means. For certain purposes it is desirable to use a linear scale in such instruments, as for a graphic meter for making a continuous record of the value of any electric quantity. If in Fig. 4 therefore, we assume the sliding index block 50 to be any element moving so that its distance from the central point P of the scale is proportional to the volt-amperes, (as the coupling or index block 27 in Fig. 2 of my Patent No. 1,156,413,) it will be evident that if the cord 51, is attached to the index 50, passes through hole (52) at the center of the scale, and thence around a pulley 53 carrying a pointer 54, the departure of the index block 50 from the center point P will be proportional to the volt-amperes, and this will be indicated by the linear movement of the pointer 54. It is also obvious that I may attach to the cord 51, a marking tool as indicated at 55 after the usual custom in making a continuous line on a moving recording device.

In Fig. 5 I have illustrated the application of the principal idea of my invention to use as a volt-ampere-hour meter, in somewhat similar manner. Thus the index block 50ª moves the cord 51ª, as before described, to and from the hole (52) in the center point P of the scale, as before. 56 is a table revolved in any convenient manner as by motor 57, at constant speed. This, by means of a brush wheel 62 turns the wheels of an integrating recorder I of any convenient form. Preferably one of the elements of this recorder is a long sheaf $a$ engaging a pinion $b$ fixed on the shaft 61, so as to allow of free movement of the pinion $b$. That is, the revolution of the gearing attached to the sheaf $a$ will be fast or slow in proportion to the departure of the brush wheel 62 from the center of the plate 56. By means of a bearing 58, a rod 61 is attached to the end of cord 51ª and through movable block 59 at the other end it is normally retracted by spring 60; shaft 61 carries the brush wheel 62 in contact with the table 56. When the end of the cord attached to the block 50ª is at the central point P, the brush wheel 62 is at the center of the revolving table 56. In this position the shaft 61 is obviously not rotated, and the train of gearing and indicator shown at I is idle. But the speed of rotation of the disk 62 is obviously proportional to its departure from the center of the table 56, and therefore gives a continuous integration of the volt-ampere-hours, it being understood that the instruments at I are any of the usual means of recording the total number of revolutions made by the shaft 61.

In the devices of Figs. 4 and 5, as in the other figures, the essential point is the linear indication of the length of the hypotenuse of a right angled triangle of which the known sides are respectively the watts and the wattless component of the current to be measured. In all of the forms of instrument shown the advantages flow largely from this differential movement indicated by use of a cord as a right line measurer, as will be obvious to those skilled in the art.

Having thus described my invention and illustrated its use, what I claim is the following:

1. A direct indicating volt-ampere meter, comprising an element moved in proportion to the watts of a circuit to be measured, an element moved in proportion to the wattless component in said circuit, mechanism conjointly moved by both said movements in a direct line, and an indicator governed by said direct line mechanism.

2. A direct indicating volt-ampere meter, comprising an element moved in proportion to the watts of a circuit to be measured, an element moved in proportion to the wattless component in said circuit, and mechanism to combine and integrate the effects of both said movements in a direct indication.

3. The combination in an electric indicator, of mechanism having a linear movement proportional to the watts of a circuit to be measured, an element having linear movement proportional to the wattless component of said circuit, an indicating mechanism and a device to actuate the same by reason of the conjoint effect of the said linear movements of said moving elements.

4. A volt-ampere meter comprising two elements moved in substantially straight lines substantially at right angles to each other, an indicating device, and a cord adapted to govern said indicator by its linear movements and in turn attached to a connection of said actuating elements, substantially as described.

5. A direct-indicating volt-ampere meter comprising an element moved in proportion to the true watts in the circuit to be measured, an element moved in proportion to the wattless component of the circuit, a supplemental element moved by the conjoint action of said first named elements, and a device for integrating and indicating, governed by said resultant movement, substantially as described.

6. An electric indicating instrument comprising mechanism making a direct linear movement proportional to the watts of a circuit being measured, a mechanism making a direct linear movement at right angles to the first movement proportional to the wattless component of said circuit, and a supplemental indicator having an element moved conjointly by said first two mechanisms in a straight line and showing the resultant of said first two independent movements, substantially as described.

7. A direct reading volt-ampere meter comprising two mechanical elements moved respectively in proportion to the watts and to the wattless component in the circuit to be measured, and a flexible cord connected to said elements and conjointly moved thereby in a right line, and measuring means controlled by said cord, sustantially as described.

In testimony whereof I have hereunto signed my name in the presence of the two subscribed witnesses.

PAUL M. LINCOLN.

Witnesses:
 W. A. HECKMAN,
 FREDK. STAUBB.